(12) United States Patent
Militello

(10) Patent No.: US 6,724,116 B1
(45) Date of Patent: Apr. 20, 2004

(54) ALTERNATOR PERMANENT MAGNET ROTOR DESIGN

(75) Inventor: Anthony Militello, Ypsilanti, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/326,627

(22) Filed: Dec. 20, 2002

(51) Int. Cl.⁷ .............. H02K 1/28; H02K 21/14; H02K 1/27
(52) U.S. Cl. .............. 310/156.72; 310/156.8; 310/156.66; 310/156.71; 310/156.73
(58) Field of Search .............. 310/263, 156.08, 310/156.12, 156.18, 156.66–156.72

(56) References Cited

U.S. PATENT DOCUMENTS

| | | | |
|---|---|---|---|
| 769,090 A | | 8/1904 | Johnson .............. 310/263 |
| 1,327,375 A | * | 1/1920 | Dean .............. 310/156.18 |
| 3,263,107 A | * | 7/1966 | Richards, Jr. .............. 310/106 |
| 3,903,863 A | * | 9/1975 | Katsumata .............. 123/149 D |
| 5,543,676 A | | 8/1996 | York et al. .............. 310/263 |
| 5,578,885 A | | 11/1996 | Alford et al. .............. 310/263 |
| 5,811,908 A | * | 9/1998 | Iwata et al. .............. 310/261 |
| 5,969,459 A | | 10/1999 | Taniguchi et al. .............. 310/263 |
| 5,973,435 A | | 10/1999 | Irie et al. .............. 310/263 |
| 6,172,441 B1 | | 1/2001 | York et al. .............. 310/263 |
| 6,311,383 B1 | * | 11/2001 | Umeda et al. .............. 29/596 |
| 6,452,301 B1 | * | 9/2002 | Van Dine et al. .............. 310/156.12 |
| 2001/0000291 A1 | | 4/2001 | York et al. .............. 310/263 |

* cited by examiner

Primary Examiner—Burton Mullins
(74) Attorney, Agent, or Firm—Brinks Hofer Gilson & Lione

(57) ABSTRACT

A rotor assembly for an alternator includes an electrical wire defining an excitation winding. A first pole piece and a second pole piece each have a generally circular body defining an axis of rotation and an outer radial periphery. A plurality of pole fingers are spaced radially about and extend axially from the outer radial periphery of each pole piece parallel to the axis of rotation. Each pole piece includes a plurality of mounting surfaces spaced radially about the outer radial periphery between the pole fingers. A plurality of permanent magnets are positioned on the mounting surfaces, each of the permanent magnets being secured to the pole pieces by a threaded fastener extending therethrough and engaging the pole pieces.

19 Claims, 3 Drawing Sheets

ALTERNATOR PERMANENT MAGNET ROTOR DESIGN

FIELD OF INVENTION

The invention relates to an automotive electrical alternator, and particularly to an alternator having a rotor assembly of a hybrid design including permanent magnets mounted thereon.

BACKGROUND OF THE INVENTION

This invention is related to an electrical alternator, particularly adapted for use in motor vehicle applications including passenger cars and light trucks. These devices are typically mechanically driven using a drive belt wrapped on a pulley connected to the crankshaft of the vehicle's internal combustion engine. The belt drives a pulley on the alternator which rotates an internal rotor assembly to generate alternating current (AC) electrical power. This alternating current electrical power is rectified to direct current (DC) and supplied to the motor vehicle's electrical bus and storage battery.

While alternators have been in use in motor vehicles for many decades, today's demands on motor vehicle design, cost, and performance have placed increasing emphasis on the design of more efficient alternators. Today's motor vehicles feature a dramatic increase in the number of electrical on-board systems and accessories. Such electrical devices include interior and exterior lighting, climate control systems; increasingly sophisticated power train control systems, vehicle stability systems, traction control systems, and anti-lock brake systems. Vehicle audio and telematics systems place further demands on the vehicle's electrical system. Still further challenges in terms of the output capacity of the motor vehicle's electrical alternators will come with the widespread adoption of electrically assisted power steering and electric vehicle braking systems. Compounding these design challenges is the fact that the vehicle's electrical system demands vary widely, irrespective of the engine operating speed which drives the alternator and changes through various driving conditions.

In addition to the challenges of providing high electrical output for the vehicle electrical alternator, further constraints include the desire to minimize the size of the alternator with respect to under hood packaging limitations, and its mass which relates to the vehicle's fuel mileage.

In addition to the need of providing higher electrical output, designers of these devices further strive to provide high efficiency in the conversion of mechanical power delivered by the engine driven belt to electrical power output. Such efficiency translates directly into higher overall thermal efficiency of the motor vehicle and thus into fuel economy gains. And finally, as is the case with all components for mass-produced motor vehicles, cost remains a factor in the competitive offerings of such components to original equipment manufacturers.

One method which has been used to increase the power output of conventional electric alternators is to mount one or more permanent magnets onto an outer surface of the rotor to produce a significantly stronger magnetic field. The combined effect of the permanent magnets and the wound field coil enables the machine to produce substantially more electrical power output. It is difficult, however, to secure the permanent magnets onto the rotor because the rotor rotates at speeds of up to 25,000 RPM and is exposed to various environmental conditions.

One method of securing the magnets onto the rotor is to lengthen the intermeshing fingers of the pole pieces so that they extend outward over the magnets to hold the magnets onto the adjacent pole piece. This however adds stress to the fingers when the rotor is spinning rapidly which causes the fingers to flex outward into the gap between the rotor and the stator. The distance between the rotor and the stator is controlled very closely because the closer the rotor and stator are to one another, the higher the electrical power output will be. Flexation of the fingers outward will force the alternator to be designed with a larger gap which will reduce the power output of the alternator.

Further, the permanent magnets are generally brittle and require expensive grinding operations to meet size tolerances, thereby making it difficult and expensive to shape the permanent magnets in a manner that will allow the permanent magnets to be locked onto the rotor.

Therefore, there is a need for an alternator rotor assembly having permanent magnets mounted thereon to increase the power output of the alternator, wherein the permanent magnets are mounted onto the rotor in a way that does not affect the structural robustness of the rotor and does not require tight tolerances on the size and shape of the permanent magnets.

SUMMARY OF THE INVENTION

In a first aspect of the present invention, a rotor assembly includes first and second poles each having a plurality of pole fingers spaced radially about and extending axially from a periphery of the poles and a plurality of mounting surfaces spaced radially about and between the pole fingers. In the assembled condition, the pole pieces fit together such that the pole fingers interleave in the well known "clawpole" configuration. Permanent magnets are positioned on the mounting surfaces and threaded fasteners are provided to secure the permanent magnets to the pole pieces.

In another aspect of the present invention, each of the permanent magnets includes a plate mounted onto a top surface of the permanent magnet to protect the permanent magnet and to distribute the clamp force on the magnet that is applied by the fastener. The plate may also be used to help to spatially distribute the magnetic flux from the magnet.

In still another aspect of the present invention, each of the pole fingers of the first pole piece includes a distal end that extends between the pole fingers of the second pole piece. The distal ends of the pole fingers of the first pole piece are positioned over the mounting surfaces of the second pole piece. Each of the pole fingers of the second pole piece includes a distal end that extends between the pole fingers of the first pole piece. The distal ends of the pole fingers of the second pole piece are positioned over the mounting surfaces of the first pole piece. The fasteners extend through the distal ends and through the permanent magnets to secure the distal ends of the fingers, along with the permanent magnets, to the mounting surfaces.

In yet another aspect of the present invention the permanent magnets are secured to the plates with an adhesive and the permanent magnets are secured to the mounting surfaces with an adhesive.

In still another aspect of the present invention the plates are made from a magnetic material and the threaded fasteners are made from a non-magnetic material.

Additional benefits and advantages of the present invention will become apparent to those skilled in the art to which the present invention relates from the subsequent description of the preferred embodiment and the appended claims, taken in conjunction with the accompanying drawings.

DESCRIPTION OF THE PREFERRED EMBODIMENTS

Figure 1:
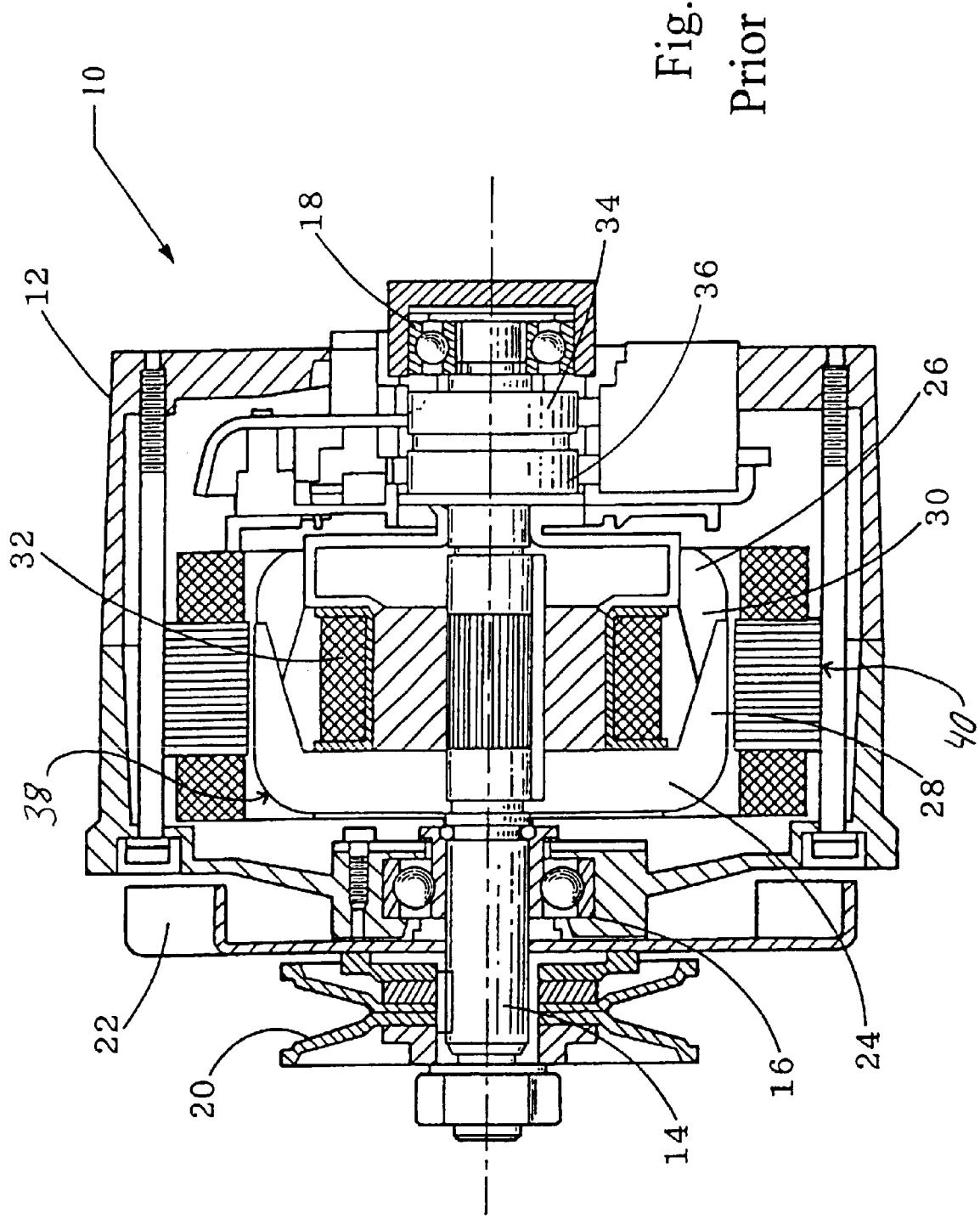
FIG. 1 is a cross sectional view of a typical prior art electrical alternator.

In order to provide a framework for a further detailed description of the preferred embodiments of this invention, FIG. 1 is presented illustrating a prior art electrical alternator configuration. That figure illustrates an electrical alternator 10 enclosed within a housing 12. An alternator rotor shaft 14 is supported by rolling element bearings 16 and 18 and a belt driven pulley 20 is fastened to the protruding front end of the rotor shaft 14. Rotating with the shaft 14, a fan 22 provides cooling airflow for removing heat from the alternator 10. Front and rear alternator pole pieces 24 and 26, respectively, rotate with the shaft 14 and have extending claw fingers 28, 30, respectively. The claw fingers 28, 30 interlace to create the well known "claw pole" rotor configuration. An excitation winding 32 is carried within the cavity formed between the pole pieces 24, 26, and a DC excitation signal is applied to the excitation winding 32 through a pair of slip rings 34, 36, and associated brushes.

The pole pieces 24, 26, and the winding 32 constitute a rotor assembly 38, which produces an alternating polarity magnetic field that rotates with rotation of the rotor assembly 38. Although a DC excitation signal is applied to the winding 32, the interlacing of the alternating poles 24, 26 creates an alternating polarity magnetic field. This field is presented to the stator windings of a stationary stator core 40 located radially around the rotor assembly 38. The movement of the alternating polarity magnetic field presented by the rotor assembly 38 across stator windings of the stator core 40 generates electricity in a well-known manner.

Electrical energy output by the electrical alternator 10 is directed to rectifying diodes (not shown), and perhaps further filtering and power conditioning devices, before being connected with the vehicle's electric distribution bus (also not shown). Sophisticated control systems, also known as voltage regulators, are used to apply an appropriate level of DC voltage to the excitation windings 32 to generate the desired RMS value of the outputted alternating current from the alternator 10, which can be in single phase or multi-phase form, depending on the winding design of the stator 40.

Figure 2:
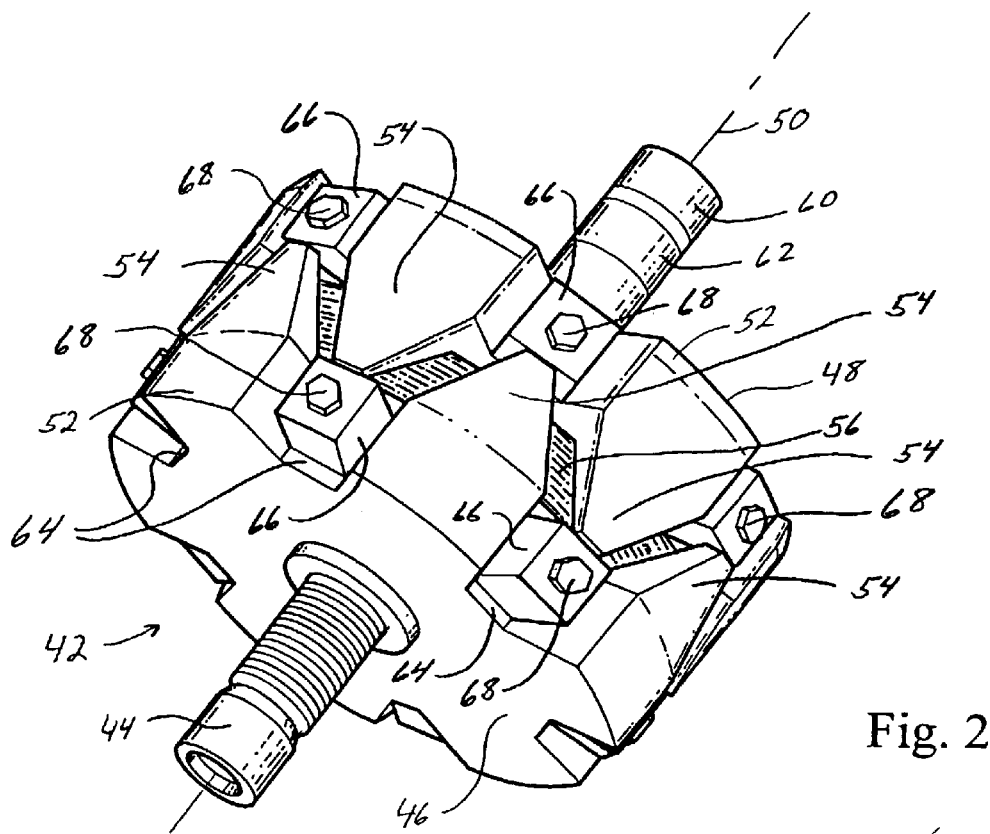
FIG. 2 is a perspective view of the rotor assembly shown with permanent magnets mounted thereon.
Figure 3:
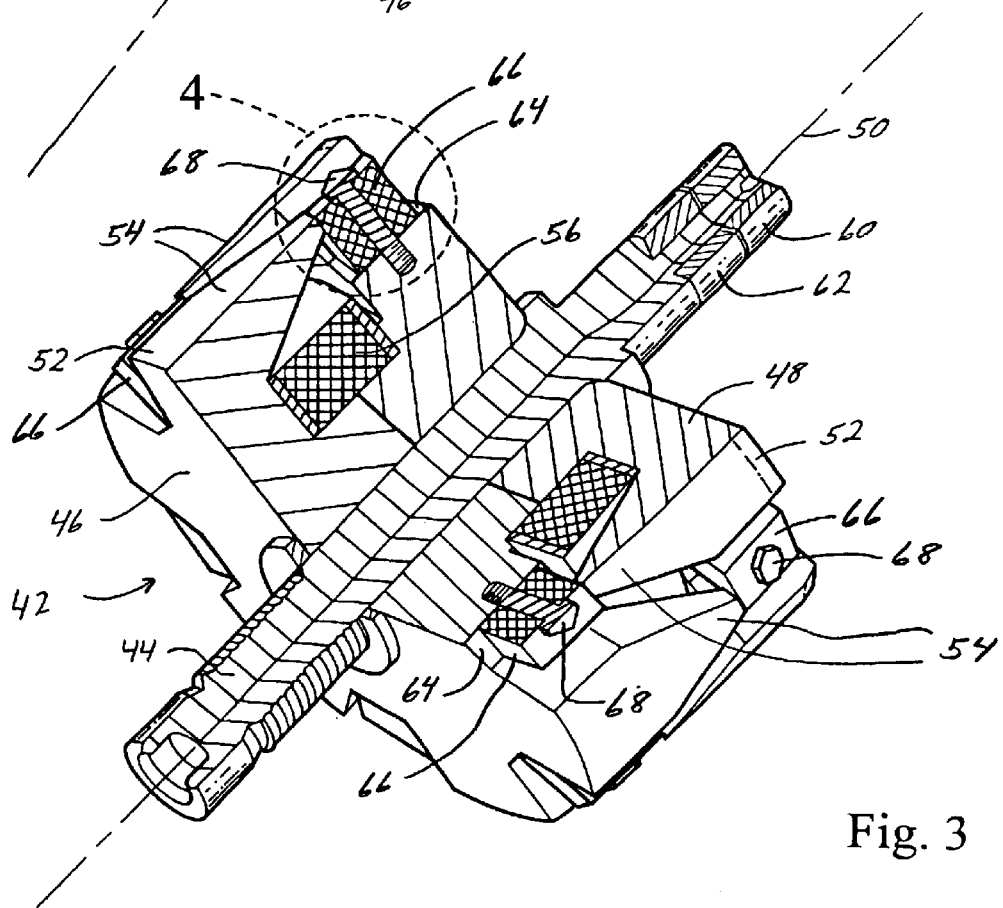
FIG. 3; is a partial sectional view of a first preferred embodiment where pole fingers do not extend over the permanent magnets.
Figure 4:
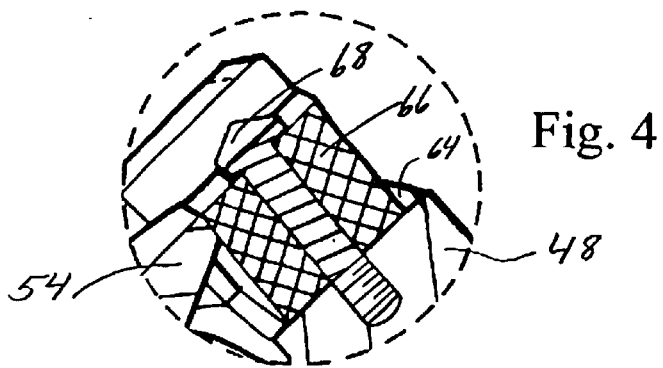
FIG. 4 is a close-up view of a portion of FIG. 3 showing permanent magnets being attached by a threaded fastener.

Now referring to FIGS. 2 and 3, a rotor assembly of a first preferred embodiment is shown generally at 42. The rotor assembly 42 includes a rotor shaft 44 which is supported within a housing similar to the construct seen in FIG. 1. In the interest of clarity, such common features have been omitted in FIG. 2, their presence and location being well known by those skilled in the art. Rotor shaft 44 defines an axis of rotation 50. First and second pole pieces 46, 48, mounted onto shaft 44, define an outer periphery 52. The first and second pole pieces 46, 48 rotate with the shaft 44. Pole fingers 54 are spaced circumferentially about and extend axially from the outer periphery 52 of the first and second pole pieces 46, 48, parallel to the axis of rotation 50. An excitation winding 56 is carried on a bobbin within the cavity formed between poles 46, 48. A DC excitation signal is applied to the excitation winding 56 through a pair of slip rings 60, 62 mounted onto the shaft 44, and through brushes (not shown) associated therewith.

The first and second pole pieces 46, 48 each further include a plurality of mounting surfaces 64 spaced radially about the outer periphery 52 and between the pole fingers 54. Permanent magnets 66 are placed at the periphery 52 of each of the first and second pole pieces 46, 48, wherein one of the permanent magnets 66 is positioned on each of the mounting surfaces 64 of the first and second pole pieces 46, 48 as shown in FIGS. 2 and 3.

In the preferred embodiment, each of the permanent magnets 66 is secured to the pole pieces 46, 48 by a threaded fastener 68. Each of the permanent magnets 66 includes a through hole formed therein, and each of the mounting surfaces 64 includes a threaded bore formed therein. The threaded fasteners 68 are adapted to extend through the through hole within the permanent magnet 66 and to engage the threaded bore within the support surfaces 64 to secure one of the permanent magnets 66 thereon.

Figures 5, 6:
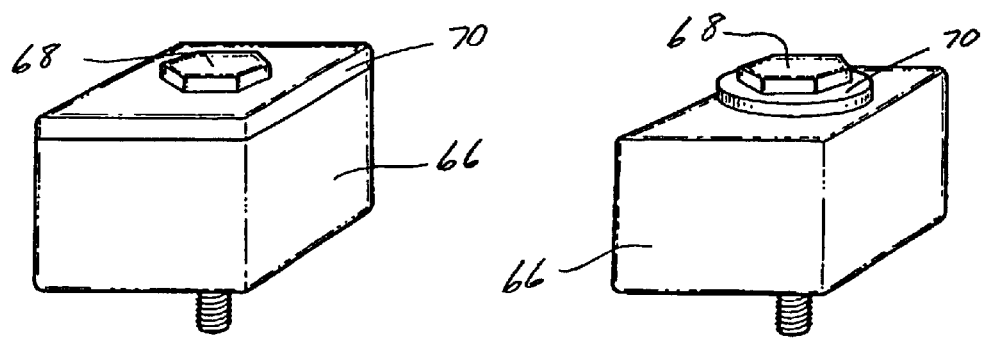
FIG. 5 is a perspective view of a permanent magnet having a plate that covers substantially all of the top surface of the permanent magnet.
FIG. 6 is a perspective view similar to FIG. 5 wherein the plate covers only a portion of the top surface of the permanent magnet.

Referring to FIGS. 5 and 6, alternatively, a plate 70 is placed onto a top surface of each of the permanent magnets 66 before the threaded fastener is placed to the permanent magnet 66: The plates 70 also have a through hole formed therein such that the threaded fasteners extends through the through hole within the plates 70, through the through hole within the permanent magnets 66, and engages the threaded bore within the support surfaces 64 of the pole pieces 46, 48. Preferably, the plates 70 are substantially the same size and shape as the top surface of the permanent magnets 66, as shown in FIG. 5. However, the plates 70 could also be a different shape and size, an example of which is shown in FIG. 6.

Preferably, the plates 70 are formed from a magnetic metal, thereby reducing the effective air gap between the stator and the rotor 42, and increasing the power density of the alternator. However, it is to be understood, that the plates 70 could be made from non-ferrous materials as well, without departing from the scope of the present invention. Preferably, the threaded fasteners 68 are made from a non-magnetic material, which would not provide a magnetic conduit from the north end of the permanent magnet 66 to the south end of the permanent magnet 66. However, the threaded fasteners 68 could also be made from a magnetic metal as well. Magnetic threaded fasteners 70 would reduce the power density of the alternator, but would otherwise work satisfactorily to secure the permanent magnets 66 onto the pole pieces 46, 48 of the rotor assembly 42.

The plates 70 can be attached to the top surfaces of the permanent magnets 66 with an adhesive prior to placing the threaded fasteners 68. Further, an adhesive can be used to secure the permanent magnets 66 to the mounting surfaces 64 prior to placing the threaded fasteners. The use of an adhesive reduces the amount of mechanical stress on the permanent magnets 66 due to vibration, mechanical loads, and other forces. Further, because the permanent magnet 66 is being held to the mounting surface 64 by the threaded fastener 68, tight tolerances of the permanent magnet 66 are not required. Therefore, the permanent magnets 66 can be made to large tolerances and will not require expensive grinding operations to manufacture, thereby lowering the cost of the permanent magnets 66 significantly. An adhesive including an epoxy resin is preferred, however, any adhesive suitable for the particular environment and conditions of the application could be utilized.

The plates 70 will provide protection for the permanent magnets 66. Typically the permanent magnets 66 are very brittle, and the plates 70 will help prevent the permanent magnets 66 from being damaged as well and keeping chips or dis-lodged pieces of the permanent magnets 66 from flying off the rotor assembly 42 when the rotor assembly 42 is rotating at high speed. The plate also distributes the clamp force on the magnet that is applied by the fastener.

Figure 7:
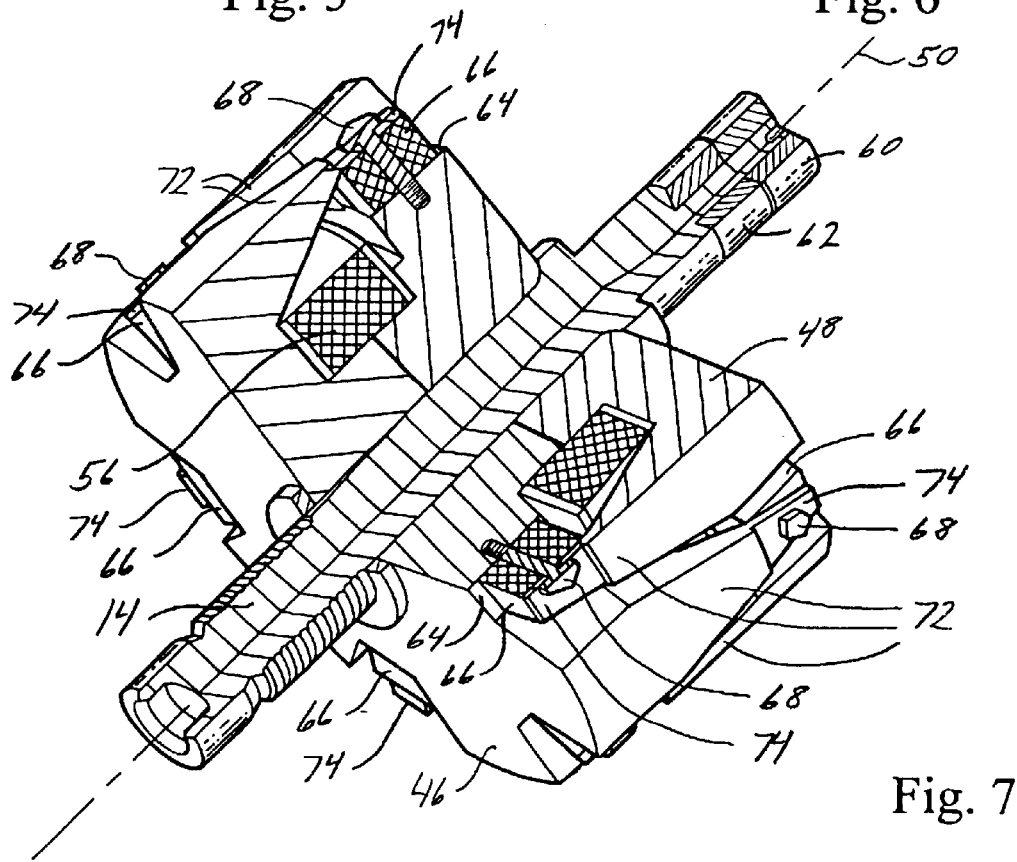
FIG. 7 is a partial sectional view of a second preferred embodiment where the pole fingers extend over the permanent magnets.

Referring again to FIGS. 2 and 3, in the first preferred embodiment, the pole fingers 54 of the first and second pole pieces 46, 48 do not extend over the mounting surfaces 64 of one another. Alternatively, as shown in FIG. 7, in a second preferred embodiment, pole fingers 72 of each of the first and second pole pieces 46, 48 extend over the mounting surfaces 64 with the permanent magnets 66 placed thereon. The pole fingers 72 include distal ends 74 which extend over the permanent magnets 66. The distal ends 74 of the fingers 72 include through holes formed therein such that the threaded fasteners extend through the through holes within the distal ends 74 of the fingers 72, through the through holes formed within the permanent magnets 66, and engage the threaded bores within the mounting surfaces 64. The threaded fasteners 68 will keep the distal ends 74 of the pole fingers 72 secured tightly against the permanent magnets 66 and keep the distal ends 74 from flexing outward under the high rotational speed of the rotor assembly 42. Without the risk of deflection, the air gap between the rotor assembly 42 and stator can be reduced, thereby increasing the power density of the alternator 10.

It is to be understood, that the permanent magnet 66 retention described in the present invention could also be utilized in with an electric machine having a pure permanent magnet rotor or with armatures that do not contain wound fields.

While the above description constitutes the preferred embodiments of the present invention, it will be appreciated that the invention is susceptible to modification, variation and change without departing from the proper scope and fair meaning of the accompanying claims.

I claim:

1. A rotor assembly for an alternator comprising:
    a shaft defining an axis of rotation;
    a first pole piece mounted onto said shaft and having an outer periphery;
    a second pole piece mounted onto said shaft coaxial with said first pole piece, said second pole piece including an outer periphery;
    an excitation winding positioned between said first and second pole pieces;
    a plurality of first pole fingers circumferentially spaced about said periphery of said first pole piece and extending axially from said periphery generally parallel to said axis of rotation;
    a plurality of second pole fingers circumferentially spaced about said periphery of said second pole piece and extending axially from said periphery generally parallel to said axis of rotation;
    a plurality of permanent magnets positioned on said periphery of said first and second pole pieces and being located between adjacent ones of said fingers, said permanent magnets each including a through hole formed therein;
    a plurality of fasteners, one of said fasteners extending through said through hole of one of said permanent magnets and engaging one of said first and second pole pieces to secure said permanent magnets thereon; and
    a plurality of plates, one of said plates being positioned on a top surface of each of said permanent magnets and secured thereto by said fasteners, said plates covering only a portion of said top surface of said permanent magnets.

2. The rotor assembly of claim 1 wherein said plates are made from a ferrous material.

3. The rotor assembly of claim 1 further including an adhesive to adhesively attach said plates to said top surface of said permanent magnets.

4. The rotor assembly of claim 3 further including an adhesive to adhesively attach said permanent magnets to said first and second pole pieces.

5. The rotor assembly of claim 1 wherein said first pole fingers are interleaved with said second pole fingers.

6. The rotor assembly of claim 5 wherein said first pole fingers each include a distal end extending to a position located over said permanent magnets mounted onto said second pole piece, and wherein said second pole fingers each include a distal end extending to a position located over said permanent magnets mounted onto said first pole piece, said distal ends of said first and second pole fingers each including a through hole formed therein, said fasteners extending through said through hole of each of said distal ends to secure said distal ends of said pole fingers against said permanent magnets.

7. The rotor assembly of claim 6 further including an adhesive to adhesively attach said permanent magnets to said first and second pole pieces.

8. The rotor assembly of claim 1 wherein said fasteners are made from non-magnetic material.

9. The rotor assembly of claim 1 wherein said fasteners are threaded fasteners, wherein each of said threaded fasteners extend through said through hole of one of said permanent magnets and engages a threaded bore within one of said first and second pole pieces to secure said permanent magnets thereon.

10. A rotor assembly for an alternator comprising:
    a shaft defining an axis of rotation;
    a first pole piece mounted onto said shaft and having an outer periphery;
    a second pole piece mounted onto said shaft coaxial with said first pole piece, said second pole piece including an outer periphery;
    an excitation winding positioned between said first and second pole pieces;
    a plurality of first pole fingers circumferentially spaced about said periphery of said first pole piece and extending axially from said periphery generally parallel to said axis of rotation;
    a plurality of second pole fingers circumferentially spaced about said periphery of said second pole piece and extending axially from said periphery generally parallel to said axis of rotation, said second pole fingers interleaved with said second pole fingers;

a plurality of permanent magnets positioned on said periphery of said first and second pole pieces and being located between adjacent ones of said fingers, said permanent magnets each including a through hole formed therein; and a plurality of fasteners, one of said fasteners extending through said through hole of one of said permanent magnets and engaging one of said first and second pole pieces to secure said permanent magnets thereon;

said first pole fingers each including a distal end extending to a position located over said permanent magnets mounted onto said second pole piece, said second pole fingers each including a distal end extending to a position located over said permanent magnets mounted onto said first pole piece, said distal ends of said first and second pole fingers each including a through hole formed therein, said fasteners extending through said through hole of each of said distal ends to secure said distal ends of said pole fingers against said permanent magnets.

11. The rotor assembly of claim 10 further including a plurality of plates, one of said plates being positioned on a top surface of each of said permanent magnets and secured thereto by said fasteners.

12. The rotor assembly of claim 11 wherein said plates cover substantially all of said top surface of said permanent magnets.

13. The rotor assembly of claim 11 wherein said plates cover only a portion of said top surface of said permanent magnets.

14. The rotor assembly of claim 11 wherein said plates are made from a ferrous material.

15. The rotor assembly of claim 11 further including an adhesive to adhesively attach said plates to said top surface of said permanent magnets.

16. The rotor assembly of claim 15 further including an adhesive to adhesively attach said permanent magnets to said first and second pole pieces.

17. The rotor assembly of claim 10 further including an adhesive to adhesively attach said permanent magnets to said first and second pole pieces.

18. The rotor assembly of claim 10 wherein said fasteners are made from non-magnetic material.

19. The rotor assembly of claim 10 wherein said fasteners are threaded fasteners, wherein each of said threaded fasteners extend through said through hole of one of said permanent magnets and engages a threaded bore within one of said first and second pole pieces to secure said permanent magnets thereon.

* * * * *